March 20, 1962 H. H. BENJAMIN ETAL 3,026,138
HAND SCOOP
Filed Aug. 26, 1958
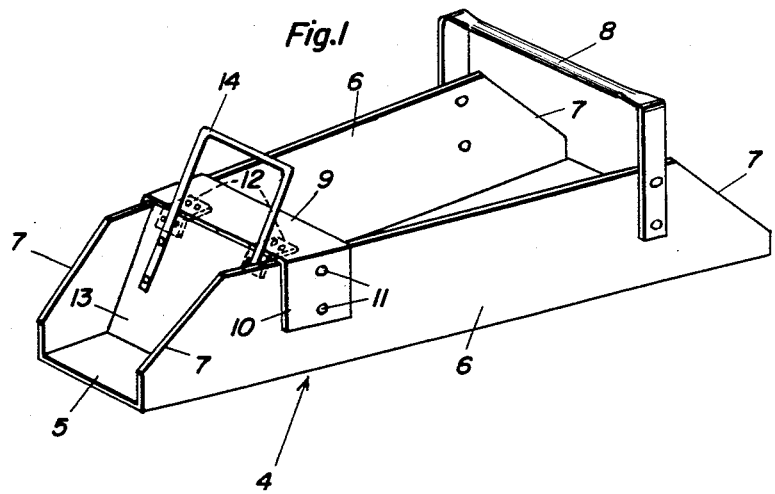
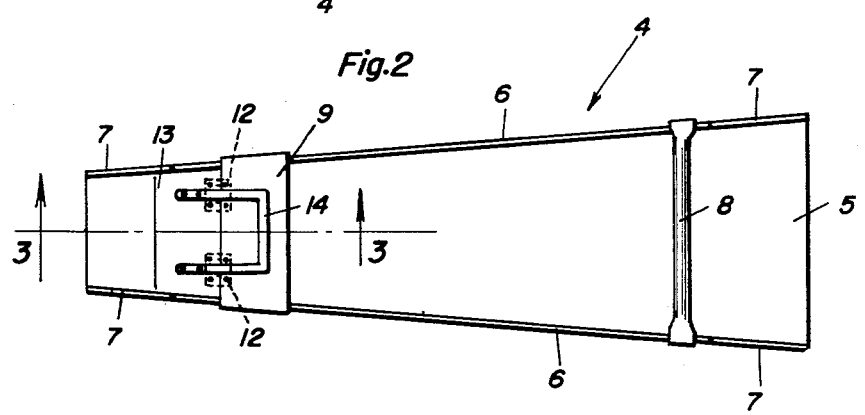
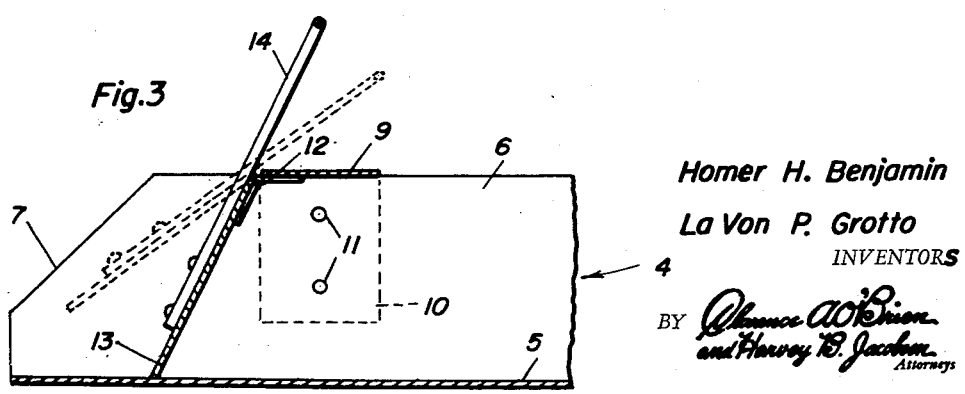
Homer H. Benjamin
La Von P. Grotto
INVENTORS

United States Patent Office 3,026,138
Patented Mar. 20, 1962

3,026,138
HAND SCOOP
Homer H. Benjamin, Rte. 2, Litchfield, Minn., and
La Von P. Grotto, Rte. 1, Grove City, Minn.
Filed Aug. 26, 1958, Ser. No. 757,258
2 Claims. (Cl. 294—55)

This invention relates to new and useful improvements in hand scoops and has for its primary object to provide, in a manner as hereinafter set forth, novel means for expeditiously and without waste, filling hanging poultry feeders, grain drill and corn planter boxes, sacks and other containers which are too small to receive a conventional scoop or shovel.

Another important object of the present invention is to provide a scoop of the character described which is adapted to fill at one end and discharge at its other end.

Still another important object of the invention is to provide a scoope of the aforementioned character comprising novel means for controlling or regulating the discharge of the feed, seed or other product.

Other objects of the invention are to provide a hand scoop of the character described which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a perspective view of a hand scoop constructed in accordance with the present invention;

FIGURE 2 is a top plan view of the device; and

FIGURE 3 is an enlarged view in vertical longitudinal section through the forward end portion of the device, taken substantially on the line 3—3 of FIGURE 2.

Referring now to the drawing in detail, it will be seen that the embodiment of the invention which has been illustrated comprises what may be considered a trough of suitable metal which is designated generally by reference character 4. The trough 4, which may also be of any desired dimensions, is open at both ends and comprizes a flat bottom 5 and upstanding side walls or flanges 6. The end portions of the side walls 6 of the trough 4 are beveled, as indicated at 7. As shown to advantage in FIGURE 2 of the drawing, the trough 4 tapers toward its forward end, the side walls or flanges 6 thereof being forwardly convergent.

Mounted on the rear end portion of the trough 4 is a substantially inverted U-shaped, transverse handle 8. Mounted transversely on the forward end portion of the trough 4 is an inverted U-shaped metallic bar or plate 9. The downturned end portions 10 of the bar 9 are riveted to the side wall 6 of the trough 4 as indicated at 11.

Hingedly mounted at 12 for vertical swinging movement on the bar 9 and operable in the forward end portion of the trough 4 is a regulating valve or gate 13 in the form of a plate. Fixed on the hinged end portion of the gate 13 and projecting upwardly therefrom is an inverted U-shaped handle 14.

It is thought that the use of the device will be readily apparent from a consideration of the foregoing. Briefly, the user grasps the handle 8 in one hand and the handle 14 in the other hand. The poultry feed or other product being handled is scooped into the trough 4 at the comparatively wide rear end thereof. The gate 13, when in closed position, prevents the escape of the feed from the forward end of the trough 4. To fill a hanging poultry feeder, for example, the relatively narrow forward end portion of the tapered trough 4 is inserted in the feeder and the gate 13 is swung upwardly to open position through the medium of the handle 14 as suggested in dotted lines in FIGURE 3 of the drawings. The gate 13, it will be noted, is spaced rearwardly from the forward end of the trough 4 and is operable within the confines of said trough. Thus, when the forward end portion of the trough is inserted in a hanging poultry feeder, operation of the gate 13 will not be interfered with by the usual suspension wire of the feeder. This constitutes a highly important and desirable feature of the invention. Of course, the trough 4 is held at a forward and downward inclination for causing the feed to flow therefrom by gravity beneath the gate 13. The construction and arrangement of parts is such that the device may readily be used by either a right or a left handed person.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A hand scoop comprising: a longitudinally tapered trough open at both ends, said trough including a substantially flat bottom and upstanding, forwardly convergent side walls, an inverted U-shaped carrying handle affixed to said side walls on the rear end portion of the trough, a substantially U-shaped plate mounted transversely on the forward portion of the trough and having its end portions affixed to the side walls, a gate hingedly mounted for vertical swinging movement on said plate and operable in the trough within the confines thereof and in rearwardly spaced relation to the forward end thereof for controlling the discharge of material therefrom, said gate, when open, and said plate defining, in conjunction with the trough, a tubular discharge spout for the material, and a substantially U-shaped handle fixed on the hinged end portion of the gate for operating same and for carrying the forward end of the trough.

2. A hand scoop comprising a trough of generally U-shaped cross-section having an open, forward, material discharge end, a plate mounted transversely on the upper portion of the trough adjacent to but spaced rearwardly from said end thereof, a material control gate hingedly mounted for vertical swinging movement on the forward edge of the plate and operable within the confines of the trough, said gate constituting a forward continuation of said plate and, when in open position, defining in conjunction therewith and with the trough, a tubular discharge spout for the material, and an operating handle mounted on the gate, said trough including flat, vertical, forwardly convergent side walls, said trough further having an open rear end for receiving the material.

References Cited in the file of this patent

UNITED STATES PATENTS

| 661,080 | Sackett | Nov. 6, 1900 |
| 741,195 | Voelker | Oct. 13, 1903 |
| 1,212,305 | Worsell | Jan. 16, 1917 |
| 2,397,610 | Lennon | Apr. 2, 1946 |
| 2,668,648 | Carlsen | Feb. 9, 1954 |

FOREIGN PATENTS

| 469,216 | Germany | Dec. 6, 1928 |